United States Patent
Kim et al.

(10) Patent No.: US 10,790,711 B2
(45) Date of Patent: Sep. 29, 2020

(54) MAGNETIC FIELD GENERATING APPARATUS HAVING CANNON SHAPE AND MAGNETIC FIELD GENERATION METHOD THEREOF

(71) Applicants: KOREA ADVANCED INSTITUTE OF SCIENCE AND TECHNOLOGY, Daejeon (KR); UNIVERSITY-INDUSTRY COOPERATION GROUP OF KYUNG HEE UNIVERSITY, Yongin-si, Gyeonggi-do (KR)

(72) Inventors: Joung Ho Kim, Daejeon (KR); Bom Son Lee, Yongin-si (KR); Dong Hyun Kim, Daejeon (KR)

(73) Assignees: KOREA ADVANCED INSTITUTE OF SCIENCE AND TECHNOLOGY, Daejeon (KR); UNIVERSITY-INDUSTRY COOPERATION GROUP OF KYUNG HEE UNIVERSITY, Yongin-si (KR)

( * ) Notice: Subject to any disclaimer, the term of this patent is extended or adjusted under 35 U.S.C. 154(b) by 13 days.

(21) Appl. No.: 16/225,781

(22) Filed: Dec. 19, 2018

(65) Prior Publication Data

US 2019/0199146 A1    Jun. 27, 2019

(30) Foreign Application Priority Data

Dec. 21, 2017  (KR) .......................... 10-2017-0177313
Jun. 19, 2018  (KR) .......................... 10-2018-0070406

(51) Int. Cl.
*H02J 50/90*    (2016.01)
*H02J 50/12*    (2016.01)
(Continued)

(52) U.S. Cl.
CPC ................ *H02J 50/90* (2016.02); *H01F 3/10* (2013.01); *H01F 27/255* (2013.01); *H01F 27/28* (2013.01);
(Continued)

(58) Field of Classification Search
CPC .. H02J 50/10; H02J 50/12; H02J 50/60; H02J 50/90; H02J 7/025; H02J 5/005;
(Continued)

(56) References Cited

U.S. PATENT DOCUMENTS

2013/0281160 A1* 10/2013 Han ........................ H02J 50/10
                                                                      455/566
2015/0349863 A1* 12/2015 El Ayach ............. H04B 7/0456
                                                                      375/295
(Continued)

FOREIGN PATENT DOCUMENTS

JP    2013-229988 A    11/2013
JP    2018-82568 A     5/2018
(Continued)

OTHER PUBLICATIONS

Communication dated Jan. 21, 2019, issued by the Korean Patent Office in counterpart Korean Patent Application No. 10-2018-0070406.
(Continued)

*Primary Examiner* — Rexford N Barnie
*Assistant Examiner* — Jagdeep S Dhillon
(74) *Attorney, Agent, or Firm* — Sughrue Mion, PLLC

(57) ABSTRACT

Disclosed are a magnetic field generating apparatus and a method of generating a magnetic field using the same. A magnetic field generating apparatus according to an embodiment of the present disclosure includes a coil part configured to generate a magnetic field transmitted to the target to which wireless power is to be supplied; a first ferrite member
(Continued)

configured to extend in the vicinity of the coil part a bar shape and penetrate an inner peripheral surface of the coil part; and a second ferrite member configured to extend in a dome shape in the vicinity of the coil part, surround the coil part, include an opening formed along the magnetic field transmission path.

11 Claims, 19 Drawing Sheets

(51) Int. Cl.
| | |
|---|---|
| *H01F 27/36* | (2006.01) |
| *H01F 38/14* | (2006.01) |
| *H01F 27/28* | (2006.01) |
| *H02J 7/02* | (2016.01) |
| *H01F 27/255* | (2006.01) |
| *H01F 3/10* | (2006.01) |

(52) U.S. Cl.
CPC .......... *H01F 27/365* (2013.01); *H01F 38/14* (2013.01); *H02J 7/025* (2013.01); *H02J 50/12* (2016.02)

(58) Field of Classification Search
CPC ...... H01F 27/28; H01F 27/2823; H01F 38/14; H04W 88/02
USPC .............. 307/104, 149, 109, 66, 64, 82, 9.1
See application file for complete search history.

(56) References Cited

U.S. PATENT DOCUMENTS

| | | | | |
|---|---|---|---|---|
| 2016/0190855 | A1* | 6/2016 | Katabi | H02J 50/12 |
| | | | | 320/108 |
| 2017/0288469 | A1* | 10/2017 | Murashige | H01F 27/02 |
| 2018/0062444 | A1* | 3/2018 | Steinmetz | B60L 3/00 |

FOREIGN PATENT DOCUMENTS

| | | |
|---|---|---|
| KR | 10-2013-0127228 A | 11/2013 |
| KR | 10-2013-0128047 A | 11/2013 |
| KR | 10-2017-0070615 A | 6/2017 |
| KR | 10-2018-0031188 A | 3/2018 |

OTHER PUBLICATIONS

Korean Office Action for 10-2018-0070406 dated Jun. 19, 2018.

* cited by examiner

MAGNETIC FIELD GENERATING APPARATUS HAVING CANNON SHAPE AND MAGNETIC FIELD GENERATION METHOD THEREOF

CROSS-REFERENCE TO RELATED APPLICATION

This application claims the priority benefit of Korean Patent Application No. 10-2017-0177313, filed on Dec. 21, 2017, and Korean Patent Application No. 10-2018-0070406, filed on Jun. 19, 2018, in the Korean Intellectual Property Office, the disclosure of each of which is incorporated herein by reference.

BACKGROUND OF THE DISCLOSURE

Field of the Disclosure

The present disclosure relates to wireless power transmission, and more particularly, to a magnetic field generating apparatus capable of beamforming a magnetic field in a cannon shape.

Description of the Related Art

Wireless power transmission systems include a wireless power transmission device for wirelessly transmitting electrical energy and a wireless power reception device for receiving electrical energy from the wireless power transmission device.

By using a wireless power transmission system, a battery of a mobile phone can be charged, for example, merely by placing the mobile phone on a charging pad without connecting the mobile phone to a separate charging connector.

A method of wirelessly transmitting electrical energy can be classified into a magnetic induction method, a magnetic resonance method, and an electromagnetic wave method according to the principle of transferring electrical energy.

A magnetic induction method is a method of transmitting electrical energy using a phenomenon wherein electricity is induced between a transmitter coil and a receiver coil.

A magnetic resonance method is a method of generating a magnetic field oscillating at a resonance frequency in a transmitter coil and intensively transmitting energy to a receiver coil designed to operate at the same resonance frequency.

An electromagnetic wave or microwave method is a method wherein an electromagnetic wave generated in a transmitter is received by a receiver using one or several antennas and the received electromagnetic wave is converted into electrical energy.

Meanwhile, wireless power transmission can be classified into loosely coupled wireless power transfer technology (hereinafter referred to as "loosely coupled technology") and tightly coupled wireless power transfer technology (hereinafter referred to as "tightly coupled technology'") according to the magnetic resonant coupling form or strength of a transmitter coil and a receiver coil.

Here, in the case of the "loosely coupled technology," magnetic resonant coupling may be formed between one transmitter resonator and a plurality of receiver resonators, whereby multiple concurrent charging is possible.

Here, the "tightly coupled technology" merely enables power transmission between one transmitter coil and one receiver coil (one-to-one power transmission).

Wireless power transmission systems can be applied to complex wireless channel environments such as homes, offices, airports, and trains.

In addition, wireless power transmission systems can be applied to an environment in which a wireless device/IoT device/wearable device is charged by synthesizing a three-dimensional beam pattern of an array antenna based on beacon positioning technology, etc. in a three-dimensional space.

RELATED ART DOCUMENT

Patent Document

Korean Patent Application Publication No. 10-2017-0070615 entitled "WIRELESS POWER TRANSMISSION SYSTEM FOR WIRELESS POWER TRANSMISSION AND WIRELESS POWER TRANSMISSION METHOD USING THE SAME" (Jun. 22, 2017)

SUMMARY OF THE DISCLOSURE

Therefore, the present disclosure has been made in view of the above problems, and it is one object of the present disclosure to provide a wireless power transmission system applicable to complex wireless channel environments such as homes, offices, airports, and trains.

It is another object of the present disclosure to provide a magnetic field generating apparatus capable of concentrating a magnetic field on a desired target due to a cannon shape thereof and a method of generating a magnetic field using the same.

It is another object of the present disclosure to provide a magnetic field generating apparatus capable of transmitting wireless power with high efficiency due to a cannon shape thereof and a method of generating a magnetic field using the same.

It is another object of the present disclosure to provide a magnetic field generating apparatus capable of beamforming a magnetic field in a desired direction due to a cannon shape thereof and a method of generating a magnetic field using the same.

It is another object of the present disclosure to provide a magnetic field generating apparatus capable of preventing a magnetic field from transmitting in different directions, not a desired direction, due to a cannon shape thereof and a method of generating a magnetic field using the same.

It is yet another object of the present disclosure to provide an array constituted of magnetic field generating apparatuses to maximize a beamforming effect and a method of generating a magnetic field using the same.

In accordance with an aspect of the present disclosure, the above and other objects can be accomplished by the provision of a magnetic field generating apparatus including a coil part configured to generate a magnetic field transmitted to the target to which wireless power is to be supplied; a first ferrite member configured to extend in a bar shape in the vicinity of the coil part and penetrate an inner peripheral surface of the coil part; and a second ferrite member configured to extend in a dome shape in the vicinity of the coil part, surround the coil part, and include an opening formed along a magnetic field transmission path.

In addition, the first ferrite member may serve to beamform the magnetic field in one direction.

In addition, the second ferrite member may serve to shield a peripheral magnetic field of the coil part.

In addition, the magnetic field generating apparatus may further include a target tracker configured to sense the target and drive the first and second ferrite members such that the magnetic field is directed to the target.

In accordance with another aspect of the present disclosure, there is provided a magnetic field generating apparatus including a coil part configured to generate a magnetic field transmitted to the target to which wireless power is to be supplied; a ferrite beamformer with a bar shape configured to extend in a direction perpendicular to the coil part; and a ferrite shield configured to extend from a predetermined position of the ferrite beamformer and surround the coil part in a dome shape.

In addition, the ferrite beamformer may serve to beamform the magnetic field in one direction.

In addition, the ferrite shield may serve to shield a peripheral magnetic field of the coil part.

In addition, the magnetic field generating apparatus may further include a target tracker configured to sense the target and drive the ferrite beamformer and the ferrite shield such that the magnetic field is directed to the target.

In accordance with another aspect of the present disclosure, there is provided a magnetic field generating apparatus including a coil part configured to generate a magnetic field transmitted to the target to which wireless power is to be supplied; a ferrite beamformer configured to extend in a bar shape in the vicinity of the coil part; and a ferrite shield configured to include an opening formed to allow rotation of the ferrite beamformer about a first rotation axis, surround the coil part in a dome shape, and rotate about a second rotation axis perpendicular to the first rotation axis.

In addition, the ferrite beamformer may serve to beamform the magnetic field in one direction.

In addition, the ferrite shield may serve to shield a peripheral magnetic field of the coil part.

In addition, the magnetic field generating apparatus may further include a target tracker configured to sense the target by a sensor, which is included in the target tracker, and drive rotation of the ferrite beamformer and the ferrite shield such that the magnetic field is directed to the target.

In accordance with yet another aspect of the present disclosure, there is provided a method of generating a magnetic field, the method including a step of sensing a target to which wireless power is to be supplied; a step of rotating about first and second rotation axes such that a magnetic field is transmitted to the target; a step of generating the magnetic field; and a step of beamforming the generated magnetic field toward the target through a ferrite frame to supply wireless power.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF THE DISCLOSURE

Embodiments of the present disclosure are described with reference to the accompanying drawings and the description thereof, but are not limited thereto.

The terminology used in the present disclosure serves the purpose of describing particular embodiments only and is not intended to limit the disclosure. As used in the disclosure and the appended claims, the singular forms "a", "an" and "the" are intended to include the plural forms as well, unless context clearly indicates otherwise. It will be further understood that the terms "includes" and/or "including," when used in this specification, specify the presence of stated features, steps, operations, elements, and/or components, but do not preclude the presence or addition of one or more other features, steps, operations, elements, components, and/or groups thereof.

It should not be understood that arbitrary aspects or designs disclosed in "embodiments", "examples", "aspects", etc. used in the specification are more satisfactory or advantageous than other aspects or designs.

In addition, the expression "or" means "inclusive or" rather than "exclusive or". That is, unless otherwise mentioned or clearly inferred from context, the expression "x uses a or b" means any one of natural inclusive permutations.

Further, as used in the description of the disclosure and the appended claims, the singular forms "a", "an" and "the"

are intended to include the plural forms as well, unless context clearly indicates otherwise.

In addition, terms such as "first" and "second" are used in the specification and the claims merely to describe a variety of constituent elements, but the constituent elements are not limited by the terms. The terms are used only for the purpose of distinguishing one constituent element from another constituent element.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Meanwhile, in the following description of the present disclosure, a detailed description of known functions and configurations incorporated herein will be omitted when it may make the subject matter of the present disclosure unclear. The terms used in the specification are defined in consideration of functions used in the present disclosure, and can be changed according to the intent or conventionally used methods of clients, operators, and users. Accordingly, definitions of the terms should be understood on the basis of the entire description of the present specification.

Figure 1:
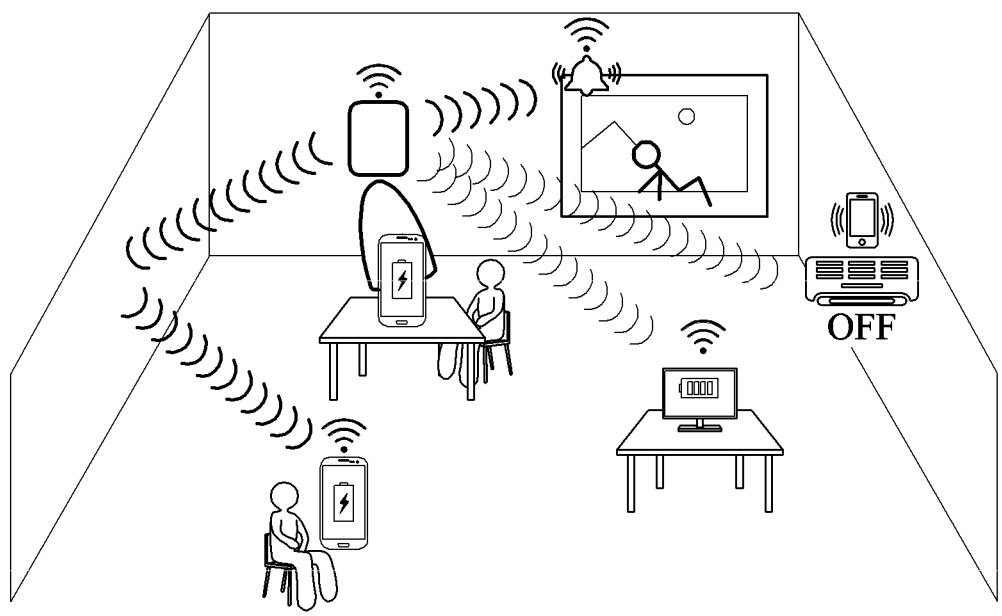
FIG. 1 is an exemplary diagram illustrating an environment where a wireless power transmission system is applied.

FIG. 1 is an exemplary diagram illustrating an environment where a wireless power transmission system is applied.

As illustrated in FIG. 1, a wireless power transmission environment may be a three-dimensional space such as a living room or a room in a home, an office, an airport, or a train.

Power transmission in a three-dimensional space may be performed by near-field wireless power transmission adopting a magnetic induction method or a magnetic resonance method. In addition, an electromagnetic wave method capable of covering near and far distances depending upon the location and type of a power reception device may be used.

Meanwhile, a power reception device may be a communication device. The power reception device may be provided with an RF harvesting device capable of collecting energy from electromagnetic waves in a three-dimensional space.

Figure 2:
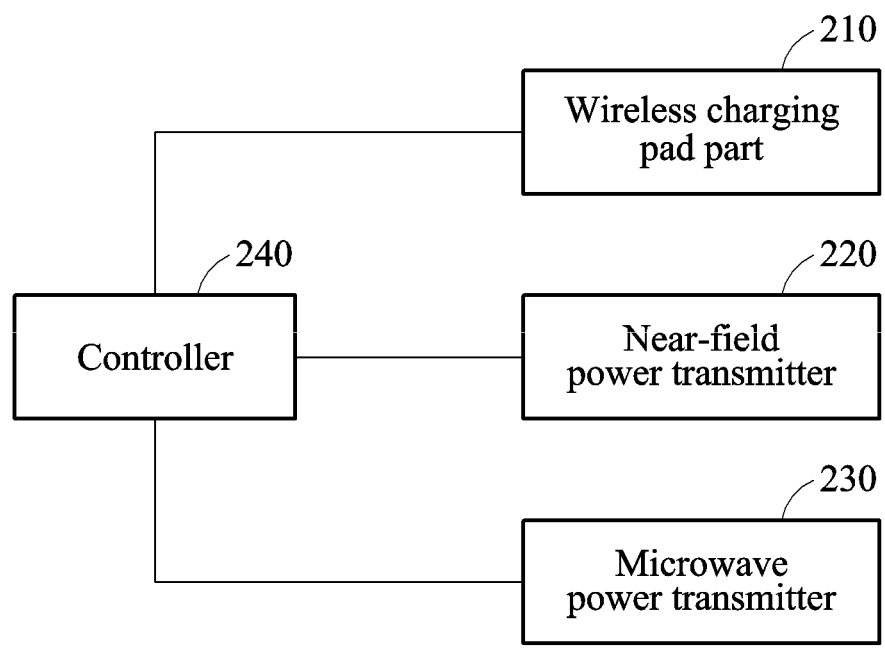
FIG. 2 is a view illustrating a wireless power transmission device capable of transmitting power in various manners in an environment as illustrated in FIG. 1.

FIG. 2 is a view illustrating a wireless power transmission device capable of transmitting power in various manners in an environment as illustrated in FIG. 1.

Referring to FIG. 2, the wireless power transmission device may include at least one of a wireless charging pad part 210, a near-field power transmitter 220, and a microwave power transmitter 230.

In other words, although all of the wireless charging pad part 210, the near-field power transmitter 220, and the microwave power transmitter 230 are illustrated in FIG. 2, a power transmission device using one power transmission manner may be merely provided depending upon a three-dimensional space environment.

Accordingly, in the following description, the wireless power transmission device or the power transmission device should be understood as including at least one of the wireless charging pad part 210, the near-field power transmitter 220, and the microwave power transmitter 230.

A controller 240 may control operation of at least one of the wireless charging pad part 210, the near-field power transmitter 220, and the microwave power transmitter 230.

The controller 240 may monitor a three-dimensional space environment and, based on the monitoring result, may control operation of at least one of the wireless charging pad part 210, the near-field power transmitter 220, and the microwave power transmitter 230.

For example, when long-distance transmission is unnecessary, the controller 240 may control the wireless charging pad part 210 and the near-field power transmitter 220 to operate and the microwave power transmitter 230 not to operate.

The wireless charging pad part 210 may transmit power by a magnetic induction method or a magnetic resonance method.

The near-field power transmitter 220 may transmit power to a three-dimensional space by a magnetic resonance method.

The microwave power transmitter 230 may transmit power to a three-dimensional space by a microwave power transmission method.

Meanwhile, "far field" may be defined as a case wherein a distance between a transmitting end and a receiving end is "2×(antenna length)$^2$/wavelength" or more.

Figure 3:
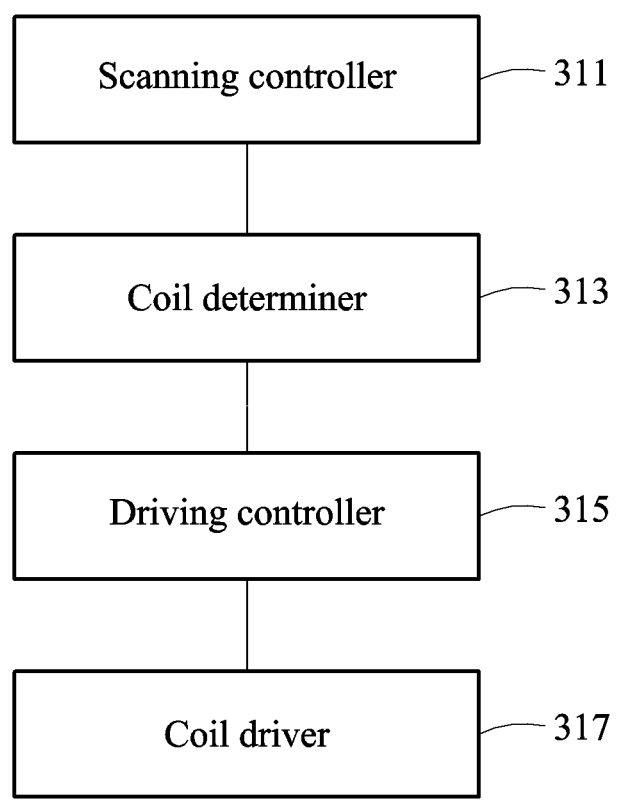
FIG. 3 is a view illustrating a configuration example of the wireless charging pad part of FIG. 2.

FIG. 3 is a view illustrating a configuration example of the wireless charging pad part of FIG. 2.

Figure 4:
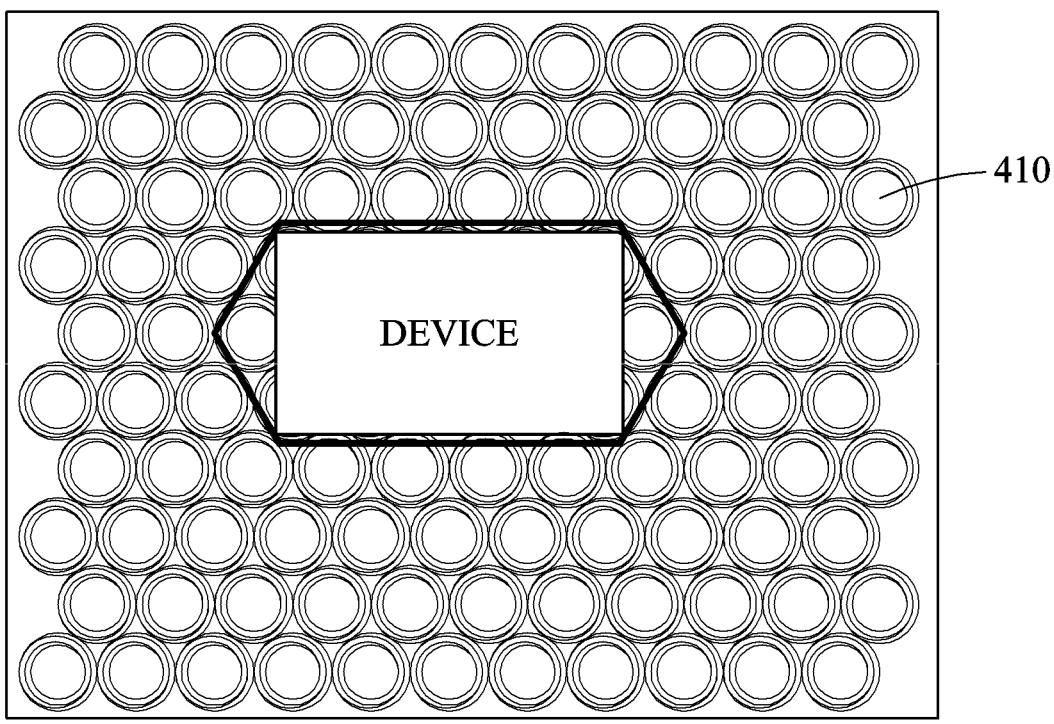
FIG. 4 is a view illustrating a configuration example of a wireless charging pad of a wireless charging pad part according to an embodiment of the present disclosure.

The device illustrated in FIG. 3 may include a wireless charging pad (not shown) and a device for driving the wireless charging pad. Here, the wireless charging pad may be configured as illustrated in FIG. 4.

The wireless charging pad-driving device may include a driving controller 315 and a coil driver 317. The wireless charging pad-driving device may further include a coil determiner 313 and a scanning controller 311.

The wireless charging pad-driving device according to an embodiment of the present disclosure may include the driving controller 315 configured to each independently control driving of a plurality of small power transmission coils constituting the wireless charging pad; and a plurality of driving modules configured to respectively drive the small power transmission coils according to a first or second control signal input by the driving controller 315.

The scanning controller 311 scans the wireless charging pad so as to detect a device to be charged on the wireless charging pad constituted of the small power transmission coils.

The scanning controller 311 may detect, using at least one of an impedance change and a pressure change in each of the small power transmission coils, whether a device to be charged is placed on the small power transmission coils.

The coil determiner 313 verifies power transmission coils to be driven, located under the device to be charged, among the small power transmission coils, and verifies power transmission coils surrounding the power transmission coils to be driven among the small power transmission coils.

The driving controller 315 may generate a first control signal to apply a first driving voltage having a first phase to the power transmission coils to be driven, and may generate a second control signal to apply a second driving voltage having a phase different from the first phase to the surrounding power transmission coils.

Here, the power transmission coils to be driven may be small power transmission coils matching a device to be charged. The expression "matching a device to be charged" may refer to a state wherein small power transmission coils are placed under or near a device to be charged to transmit power to the device to be charged.

Figure 6:
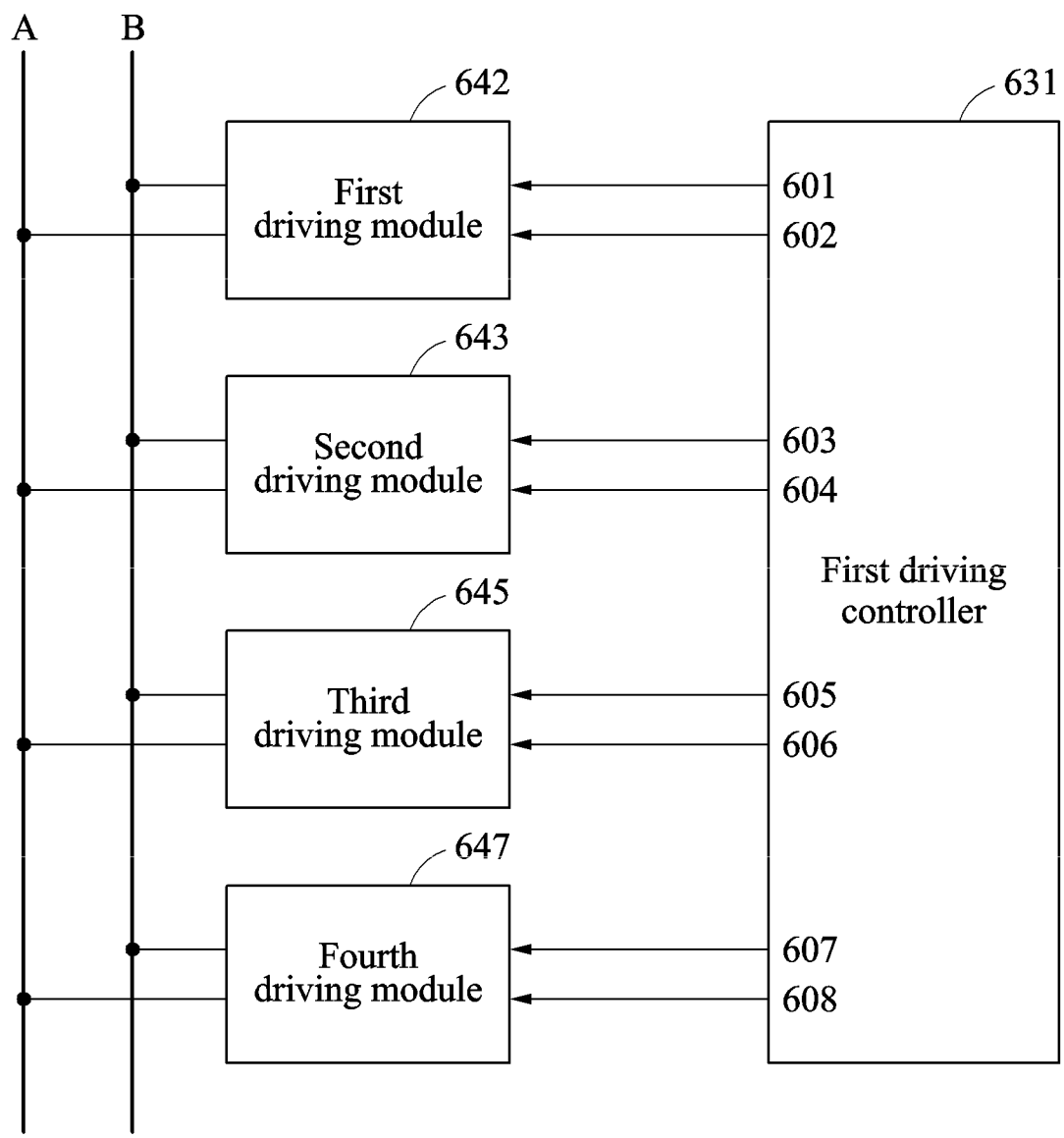
FIG. 6 is a view illustrating a configuration example of the driving controller and coil driver illustrated in FIG. 3.
Figure 7:
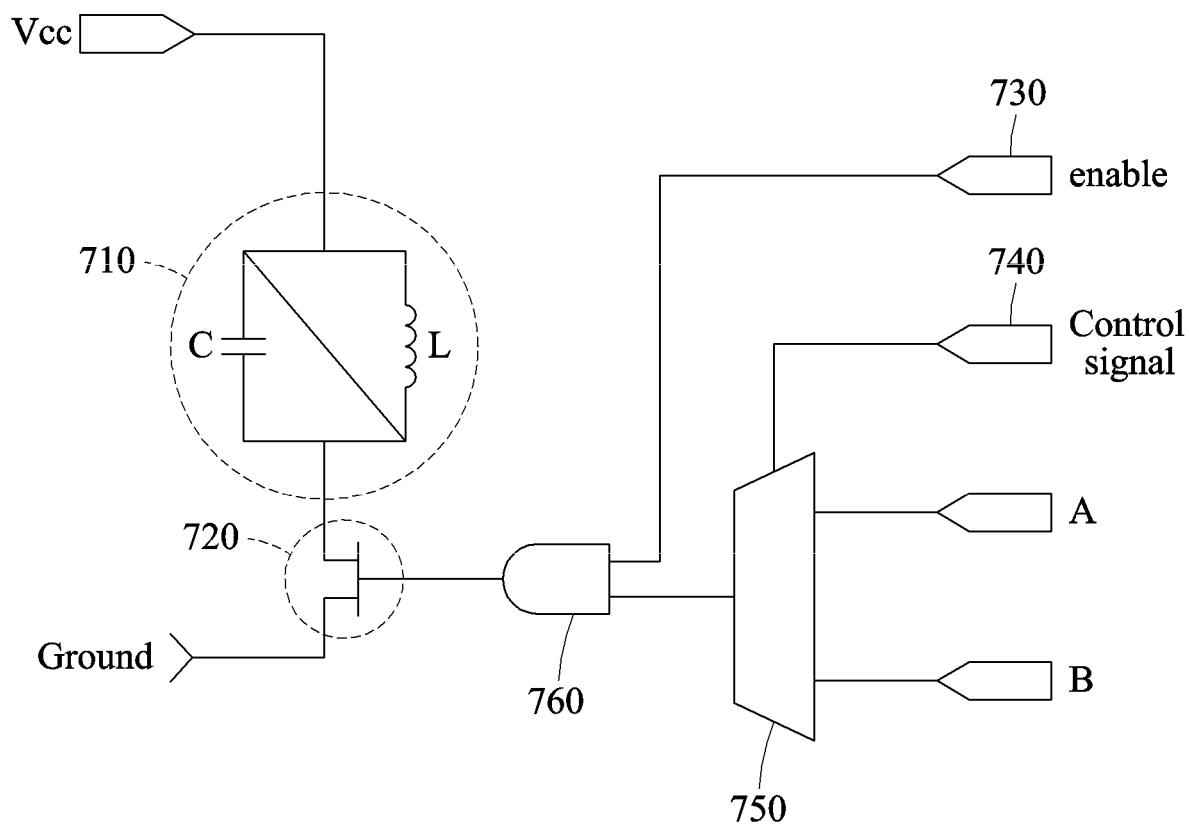
FIG. 7 is a view illustrating a configuration example of a coil driver and a connection between small power transmission coils and the coil driver, according to an embodiment of the present disclosure.

Here, the first control signal may be a "Select" signal controlling the coil driver 317 to select an "A" signal from the "A" signal and a "B" signal, which has a phase opposite to the "A" signal, illustrated in FIGS. 6 and 7.

In addition, the second control signal may be a "Select" signal controlling the coil driver 317 to select a "B" signal from the "A" signal and the "B" signal, which has a phase opposite to the "A" signal, illustrated in FIGS. 6 and 7.

The coil driver 317 applies the first and second driving signals to the wireless charging pad.

FIG. 4 is a view illustrating a configuration example of a wireless charging pad of a wireless charging pad part according to an embodiment of the present disclosure.

Referring to FIG. 4, a plurality of small power transmission coils 410 may be disposed in a tessellated structure, without overlapping each other, on the wireless charging pad.

Figure 5:
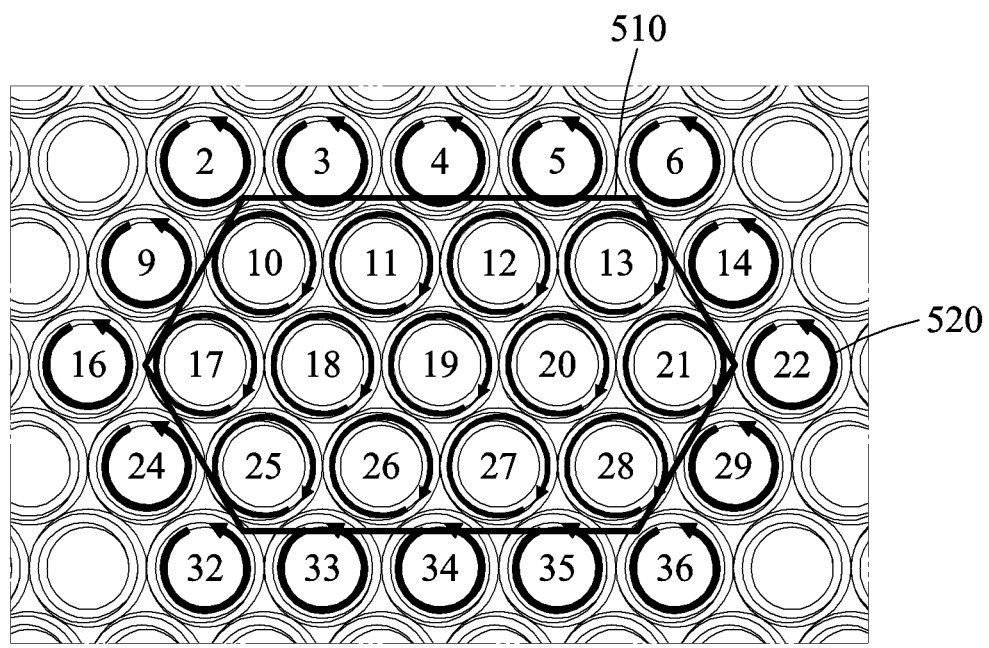
FIG. 5 is a view illustrating an operation example of the wireless charging pad illustrated in FIG. 4, on which a device to be charged is placed.

In addition, FIG. 5 illustrates "DEVICE," as an example of a device to be charged, placed on the wireless charging pad.

Here, it is possible to control to only operate small power transmission coils inside a hexagonal bold line inside which "DEVICE" is located, among a total of small power transmission coils.

FIG. 5 is a view illustrating an operation example of the wireless charging pad illustrated in FIG. 4, on which a device to be charged is placed.

Referring to FIGS. 3 and 5, the scanning controller 311 may detect whether a device to be charged is placed on corresponding small power transmission coils, using at least one of an impedance change and a pressure change in each of the small power transmission coils.

For example, upon scanning using an impedance change, a device to be charged may be determined that it has been placed on corresponding coils when an impedance change in the coils is outside a preset range.

In addition, when the small power transmission coils are respectively provided with pressure sensors, the pressure sensors may detect whether a device to be charged is placed on the pressure sensors, through pressure change.

The scanning controller 311 may detect whether a device to be charged is placed on coils 10, 11, 12, 13, 17, 18, 19, 20, 21, 25, 26, 27, and 28 by scanning the wireless charging pad.

When coils under a position at which a device to be charged is placed are detected as coils 10, 11, 12, 13, 17, 18, 19, 20, 21, 25, 26, 27, and 28, as a result of scanning by the scanning controller 311, the coil determiner 520 may verify that each of the coils 10, 11, 12, 13, 17, 18, 19, 20, 21, 25, 26, 27, and 28 is a power transmission coil to be driven.

In addition, the coil determiner 313 may verify coils 2, 3, 4, 5, 6, 9, 14, 16, 22, 24, 29, 32, 33, 34, 35, and 36, among the small power transmission coils, as coils surrounding the power transmission coils to be driven 10, 11, 12, 13, 17, 18, 19, 20, 21, 25, 26, 27, and 28.

In the embodiment illustrated in FIG. 5, clockwise arrows indicate a first phase, and counterclockwise arrows indicate a second phase.

The coil driver 317 may output the first driving signal to corresponding small power transmission coils upon receiving input of a first control signal, and may output the second driving signal to corresponding small power transmission coils upon receiving input of a second control signal.

For example, the coil driver 317 may output the first driving signal to each of power transmission coils to be driven 10, 11, 12, 13, 17, 18, 19, 20, 21, 25, 26, 27, and 28, and may output the second driving signal to each of surrounding power transmission coils 2, 3, 4, 5, 6, 9, 14, 16, 22, 24, 29, 32, 33, 34, 35, and 36.

By operating coils under a position, at which a device to be charged is located, in this manner, power may be transmitted to the device to be charged. In addition, by operating coils near the coils, which are under a position at which the device to be charged is located, to have an opposite phase, magnetic force lines toward the device to be charged may increase, but magnetic force lines spreading to the outside may be reduced.

Accordingly, even when power transmitted to the device to be charged is increased, power transmission efficiency may be maintained and influence of magnetic field lines on the outside may be reduced.

FIG. 6 is a view illustrating a configuration example of the driving controller and coil driver illustrated in FIG. 3.

FIG. 6 illustrates an embodiment wherein one driving controller (a first driving controller, 631) controls four driving modules 642, 643, 645, and 647.

Although not illustrated in FIG. 6, a plurality of driving controllers, such as second and third driving controllers, other than the first driving controller 631 may be provided.

Here, the first driving controller 631 may be a shift register having eight output signal terminals 601 to 608.

Accordingly, when first driving controllers 631, as shift registers, are connected in a cascade form, circuits for individually driving small power transmission coils may be linearly extended.

The driving modules 642, 643, 645, and 647 may be respectively connected to the small power transmission coils.

For example, the first driving module 642 may be connected to a first small power transmission coil, the second driving module 643 may be connected to a second small power transmission coil, the third driving module 645 may be connected to a third small power transmission coil, and the fourth driving module 647 may be connected to a fourth small power transmission coil.

Accordingly, when the wireless charging pad is provided with 36 small power transmission coils, the wireless charging pad may include 36 driving modules and 9 driving controllers.

Accordingly, a driving device for the wireless charging pad according to an embodiment of the present disclosure may include a first driving controller configured to each independently control driving of small power transmission coils constituting a first wireless charging module; and a second driving controller configured to each independently control driving of a plurality of small power transmission coils constituting a second wireless charging module.

Here, an end of the second driving controller may be connected to the first driving controller, and another end of the second driving controller may be connected to a third driving controller, thereby supporting expansion of the wireless charge modules.

Referring to FIG. 9 again, the coil driver includes the driving modules 642, 643, 645, and 647 respectively connected to the small power transmission coils.

In addition, the coil driver may include two bus lines that respectively apply a first switching signal A having the first phase and a second switching signal B having the second phase to the driving modules 642, 643, 645, and 647.

The first driving controller 631 applies an enable signal and a first or second control signal, which control a corresponding driving module to operate, to each of the driving modules.

The first driving controller 631 may apply an enable signal to driving modules respectively connected to the power transmission coils to be driven and the surrounding power transmission coils, and may apply the first or second control signal to the driving modules to which the enable signal is applied.

For example, when the first driving module 642 is a driving module connected to a power transmission coil to be driven, the enable signal may be output to a terminal 601, and the first control signal may be output to a terminal 602.

For example, when the fourth driving module 647 is a driving module connected to a surrounding power transmission coil, the enable signal may be output to a terminal 607, and the second control signal may be output to a terminal 608.

FIG. 7 is a view illustrating a configuration example of a coil driver and a connection between small power transmission coils and the coil driver, according to an embodiment of the present disclosure.

Referring to FIG. 7, reference numeral 710 denotes an equivalent circuit of one small power transmission coil.

One end of the small power transmission coil 710 may be connected to a driving voltage Vcc, and another end thereof may be connected to a switching element 720 provided in the coil driver.

Here, the coil driver may include the switching element 720 connected to the small power transmission coil 710; a multiplexer 750; and an AND gate element 760.

The coil driver may receive input of an enable signal through a terminal 730 and may receive input of a control signal through a terminal 740.

Here, the multiplexer 750 may output the first switching signal A when a control signal, which is input through the terminal 740, is a first control signal, and may output the second switching signal B when a control signal, which is input through the terminal 740, is a second control signal.

The AND gate element 760 may receive input of the enable signal, which is input through the terminal 730, and an output signal of the multiplexer 750 to control the switching element 720.

For example, when the small power transmission coil 710 is a power transmission coil to be driven, the first control signal may be input to the terminal 740, and the switching element 720 may be turned on/off by a switching signal such as signal A.

The driving voltage Vcc is applied to the small power transmission coil 710 according to on/off of the switching element 720, so that the small power transmission coil 710 operates as a first driving voltage having a first phase.

For example, when the switching element 720 is an NMOS transistor, a capacitor of the small power transmission coil 710 is charged in a time period in which the NMOS transistor is turned on, and is discharged in a time period in which the NMOS transistor is turned off. The magnetic field of an inductor may be controlled through repetition of such charge and discharge.

Hereinafter, a magnetic field generating apparatus will be described with reference to FIGS. 8 to 16. The magnetic field generating apparatus may be a component constituting the near-field power transmitter 220 or microwave power transmitter 230 illustrated in FIG. 2.

In addition, a magnetic field generating apparatus, described with reference to FIGS. 8 to 16, may be a component constituting the near-field power transmitter 220 and the microwave power transmitter 230 illustrated in FIG. 2.

In other words, the magnetic field generating apparatus, described with reference to FIGS. 8 to 16, may be used in long-distance power transmission as well as short-distance power transmission.

Figure 8:
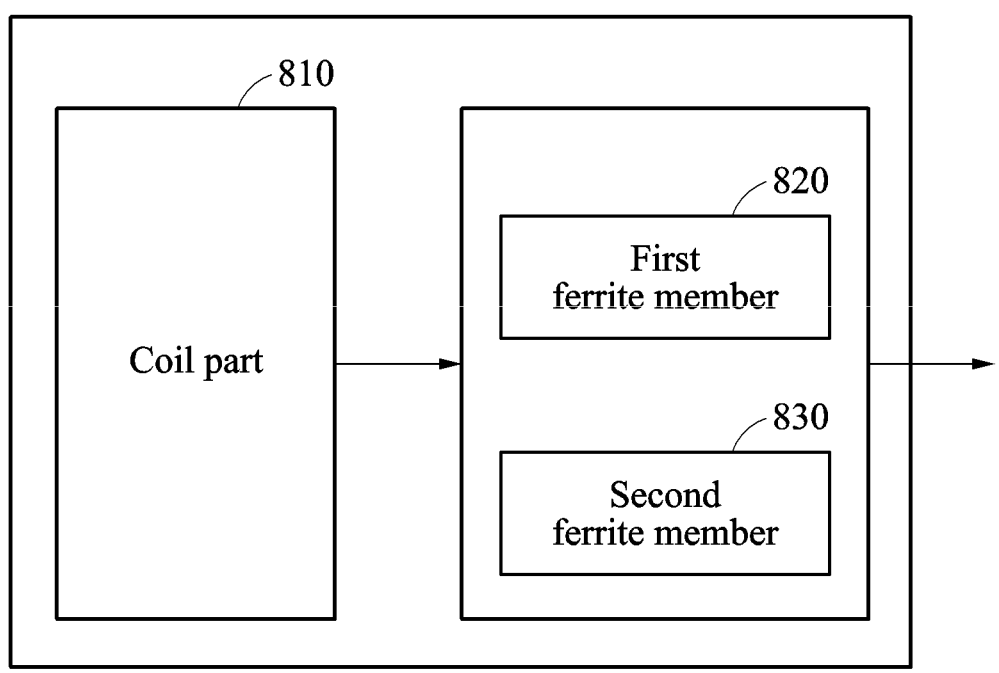
FIG. 8 illustrates a block diagram of a magnetic field generating apparatus according to an embodiment of the present disclosure.

FIG. 8 illustrates a block diagram of a magnetic field generating apparatus according to an embodiment of the present disclosure.

Referring to FIG. 8, a magnetic field generating apparatus 800 includes a coil part 810, a first ferrite member 820, and a second ferrite member 830.

The coil part 810 may generate a magnetic field that is transmitted to a target to which wireless power is to be supplied.

The coil part 810 may be a coil that is wound around an outer circumferential surface of the first ferrite member 820.

The coil part 810 may be connected to a power source to receive power and may generate a magnetic field to transmit wireless power to a target.

Here, the magnetic field may refer to an electromagnetic wave or a wireless power signal.

The target may be a wireless charging target device to which wireless power is to be supplied.

For example, the target may be a smartphone, a laptop, a wireless cleaner, an LED TV, or the like.

The target may include a reception coil.

The target may receive a magnetic field generated from the magnetic field generating apparatus 800 to receive power.

The first ferrite member 820 may extend in a bar shape in the vicinity of the coil part 810 and may penetrate an inner peripheral surface of the coil part 810.

The first ferrite member 820 may beamform a magnetic field in one direction.

The first ferrite member 820 may be formed of a ferromagnetic material.

The first ferrite member 820 may be formed of a ferrite material.

The one direction may be the same as an extension direction of the first ferrite member 820.

The second ferrite member 830 may extend in a dome shape in the vicinity of the coil part, may surround the coil part 810, and may include an opening formed along a magnetic field transmission path.

The second ferrite member 830 may shield a peripheral magnetic field of the coil part 810.

The second ferrite member 830 may be connected to the first ferrite member 820.

The second ferrite member 830 may be formed of a ferromagnetic material.

The second ferrite member 830 may be formed of a ferrite material.

The first ferrite member 820 and the second ferrite member 830 may be formed of a material in which a magnetic field is satisfactorily induced.

The peripheral magnetic field may refer to a magnetic field that spreads to a periphery of the coil part 810.

The magnetic field generating apparatus 800 according to an embodiment of the present disclosure may further include a target tracker (not shown).

The target tracker may serve to sense the target to drive the first and second ferrite members 820 and 830 such that a magnetic field is directed to the target.

The target tracker may include a target sensor and a direction driver.

The target sensor may sense a position of the target.

For example, the target sensor may be an image sensor.

The target sensor may sense a position of the target using an image around the magnetic field generating apparatus 800.

The direction driver may move the coil part 810, the first ferrite member 820 and the second ferrite member 830 so that a magnetic field is directed to the target.

The direction driver may be connected to and disposed at a lower part of the first ferrite member 820 and the second ferrite member 830.

Figure 9:
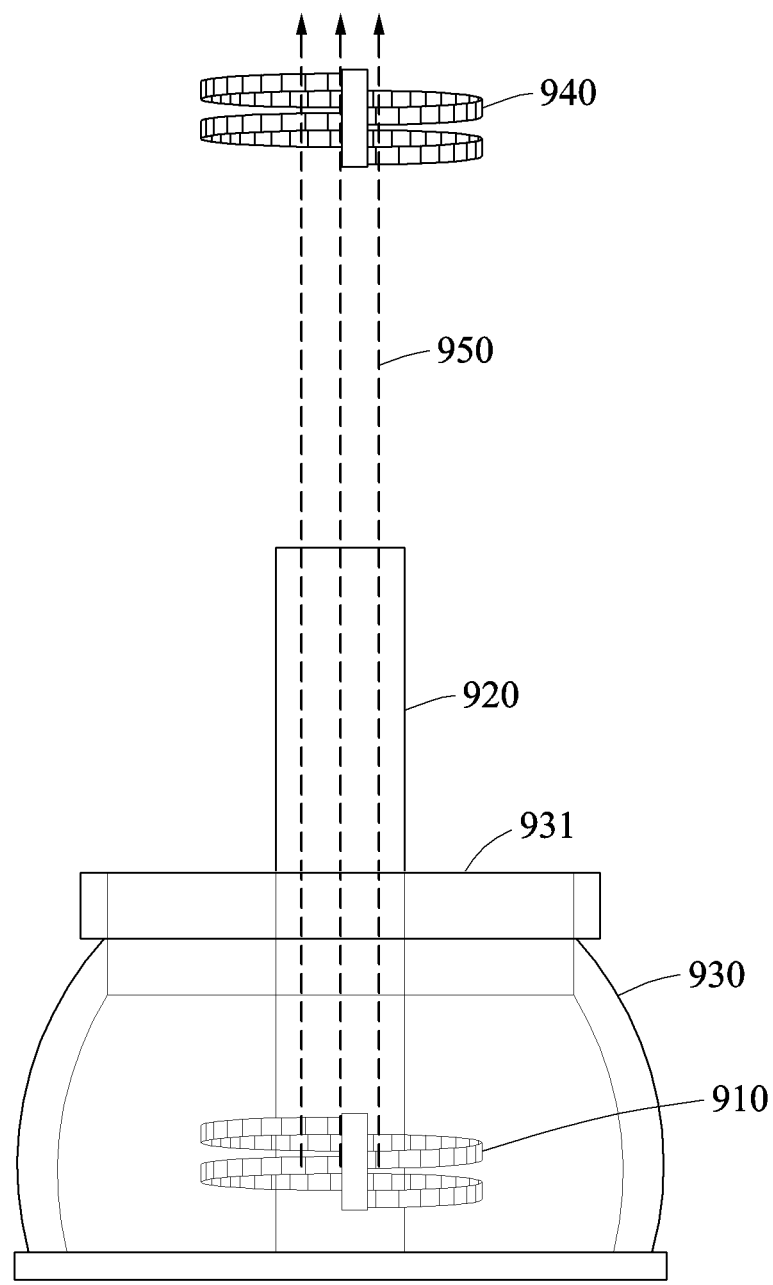
FIG. 9 illustrates the shape and operation principle of the magnetic field generating apparatus illustrated in FIG. 8.

FIG. 9 illustrates the shape and operation principle of the magnetic field generating apparatus illustrated in FIG. 8.

Referring to FIG. 9, the magnetic field generating apparatus includes a coil part 910, a first ferrite member 920, and a second ferrite member 930.

The first ferrite member 920 and the second ferrite member 930 may be connected to each other.

The first ferrite member 920 may be formed in a bar shape with a predetermined length.

For example, the predetermined length may refer to a minimum length allowing beamforming of a magnetic field 950 generated by the coil part 910.

A direction in which the first ferrite member 920 extends may be the same as one direction in which the magnetic field 950 is beamformed.

The coil part 910 may surround an outer circumferential surface of the first ferrite member 920.

The second ferrite member 930 may extend in a dome shape in the vicinity of the coil part 910.

Accordingly, the second ferrite member 930 serves to reduce a magnetic field transmitted in different directions, other than the one direction.

In other words, the second ferrite member 930 may shield a peripheral magnetic field of the coil part 910 and may concentrate a magnetic field in one direction.

The second ferrite member 930 may include an opening 931 to allow transmission of a generated magnetic field in an extension direction of the first ferrite member 920.

The first ferrite member 920 may be formed to pass through the opening 931.

The magnetic field 950 may be transmitted through the opening 931 along the first ferrite member 920.

A reception coil 940 may receive a beamformed magnetic field 950.

Figure 10:
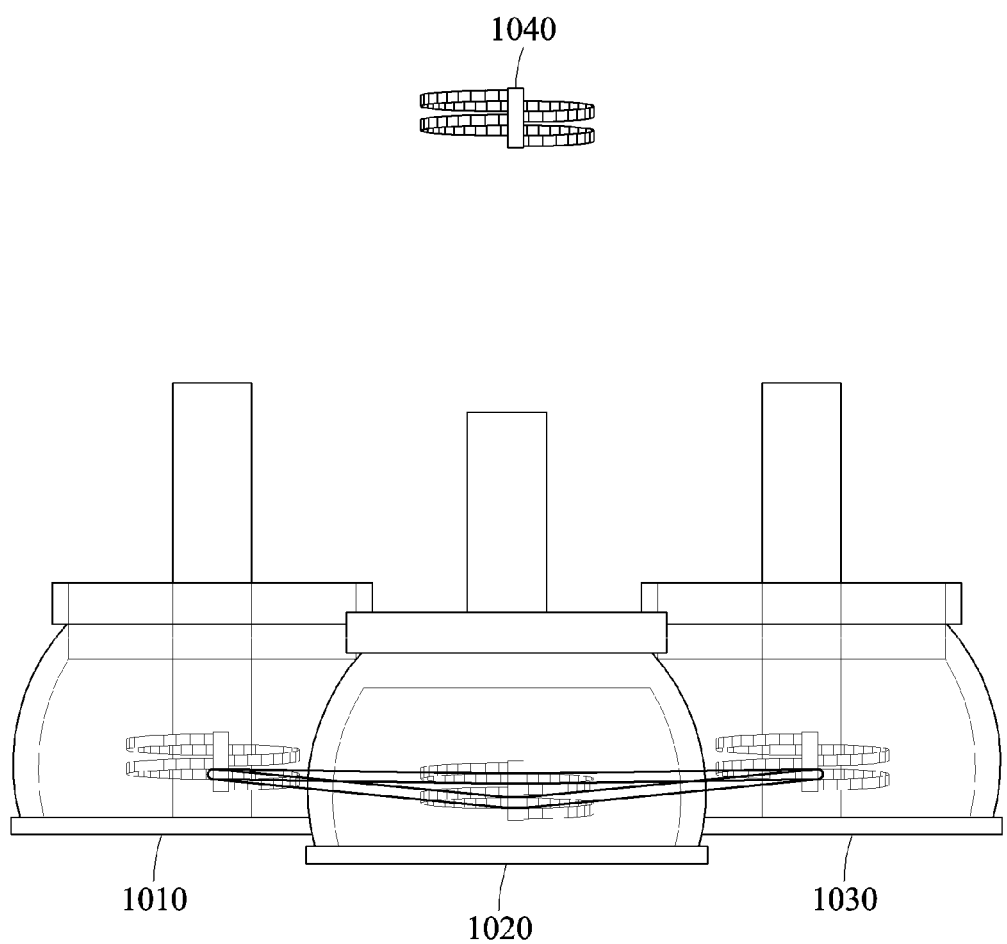
FIG. 10 illustrates an array of magnetic field generating apparatuses illustrated in FIG. 8.

FIG. 10 illustrates an array of magnetic field generating apparatuses illustrated in FIG. 8.

Referring to FIG. 10, the magnetic field generating apparatus array may include a first magnetic field generating apparatus 1010, a second magnetic field generating apparatus 1020, and a third magnetic field generating apparatus 1030.

The first to third magnetic field generating apparatuses 1010, 1020, and 1030 constituting the magnetic field generating apparatus array may transmit more wireless power by concentrating a magnetic field on a reception coil 1040.

Although the magnetic field generating apparatus array is illustrated as being constituted of the three magnetic field generating apparatuses 1010, 1020, 1030 in FIG. 10, it may be constituted of two magnetic field generating apparatuses or four or more magnetic field generating apparatuses.

In addition, magnetic field generating apparatuses of FIG. 11 to FIG. 15 may also be constituted in an array form.

Figure 11:
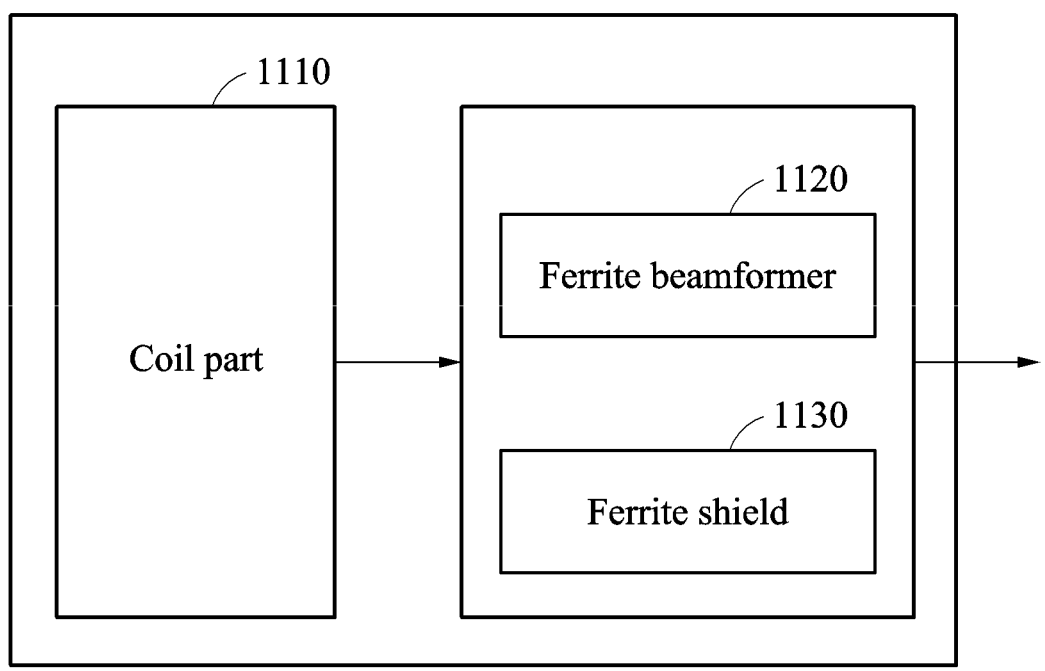
FIG. 11 illustrates a block diagram of a magnetic field generating apparatus according to another embodiment of the present disclosure.

FIG. 11 illustrates a block diagram of a magnetic field generating apparatus according to another embodiment of the present disclosure.

A magnetic field generating apparatus 1100 according to another embodiment of the present disclosure includes a coil part 1110, a ferrite beamformer 1120, and a ferrite shield 1130.

The coil part 1110 may generate a magnetic field that is transmitted the target to which wireless power is to be supplied.

The ferrite beamformer 1120 may extend in a direction perpendicular to the coil part 1110 and may have a bar shape.

The ferrite beamformer 1120 may beamform a magnetic field in one direction.

The ferrite shield 1130 may extend from a predetermined position of the ferrite beamformer 1120 and may surround the coil part 1110 in a dome shape.

The ferrite shield 1130 may shield a peripheral magnetic field of the coil part 1110.

The ferrite shield 1130 may be connected to the ferrite beamformer 1120.

The ferrite beamformer 1120 and the ferrite shield 1130 may be formed of a ferromagnetic material.

The ferrite beamformer 1120 and the ferrite shield 1130 may be formed of a ferrite material.

The ferrite beamformer 1120 and the ferrite shield 1130 may be formed of a material in which a magnetic field is satisfactorily induced.

A magnetic field generating apparatus according to another embodiment of the present disclosure may further include a target tracker (not shown).

Although the shape of the ferrite beamformer 1120 is different from that of the first ferrite member of the magnetic field generating apparatus shown in FIG. 8, a material, function, and the like thereof may be the same as those of the first ferrite member of FIG. 8.

Although the shape of the ferrite shield 1130 is different from the second ferrite member of the magnetic field generating apparatus shown in FIG. 8, a material, function, and the like thereof may be the same as those of the second ferrite member of FIG. 8.

The target tracker may serve to sense the target to drive the ferrite beamformer 1120 and the ferrite shield 1130 such that a magnetic field is directed to the target Since other components of the magnetic field generating apparatus 1100 shown in FIG. 11 are the same as those of the magnetic field generating apparatus 800 shown in FIG. 8, detailed description thereof is omitted.

Figure 12:
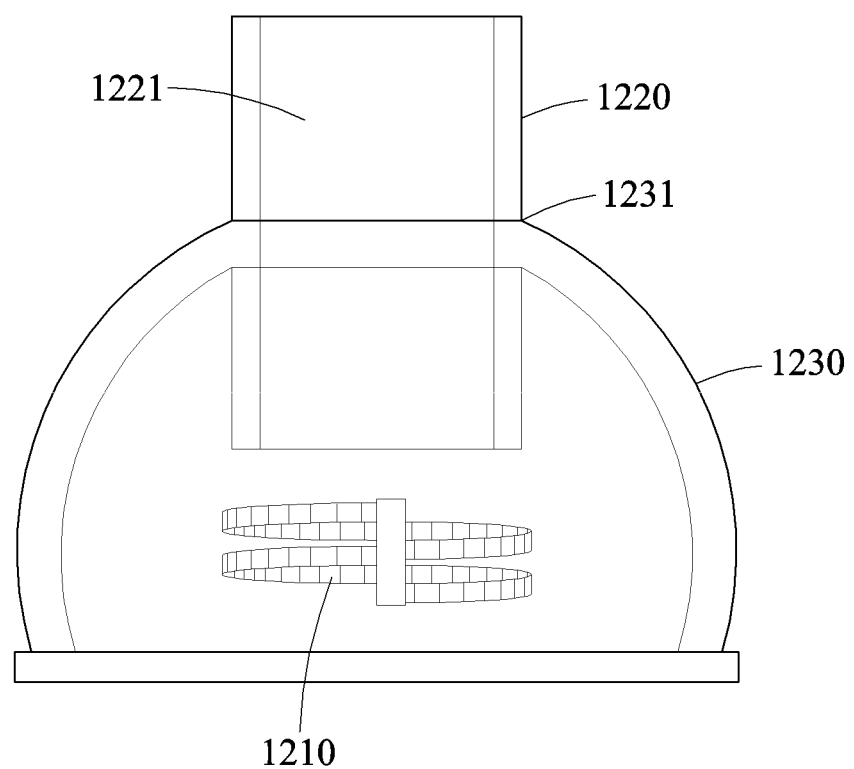
FIG. 12 illustrates the shape and operation principle of the magnetic field generating apparatus illustrated in FIG. 11.

FIG. 12 illustrates the shape and operation principle of the magnetic field generating apparatus illustrated in FIG. 11.

Referring to FIG. 12, the magnetic field generating apparatus includes a coil part 1210, a ferrite beamformer 1220, and a ferrite shield 1230.

The ferrite beamformer 1220 and the ferrite shield 1230 may be connected to each other.

The ferrite beamformer 1220 may be formed in a bar shape with a predetermined length.

For example, the predetermined length may refer to a minimum length allowing beamforming of a magnetic field generated by the coil part 1210.

One direction in which a magnetic field is beamformed may be the same as a direction in which the ferrite beamformer 1220 extends.

The ferrite beamformer 1220 may extend in a direction perpendicular to the coil part 1210.

A through hole 1221 may be formed inside the bar shape of the ferrite beamformer 1220.

A magnetic field may be beamformed and transmitted in one direction through the through hole 1221 of the ferrite beamformer 1220.

The coil part 1210 may be formed under an end of the ferrite beamformer 1220.

The ferrite shield 1230 may extend to a predetermined position 1231 of the ferrite beamformer 1220 and surround the coil part 1210.

The predetermined position 1231 may be an optimal position to prevent a magnetic field generated from the coil part 1210 from being transmitted in different directions and to concentrate the magnetic field in one direction through the ferrite beamformer 1220.

In other words, the shape of the ferrite shield 1230 allows shielding of a peripheral magnetic field of the coil part and concentration of a magnetic field in one direction.

Here, the peripheral magnetic field may refer to a magnetic field that is transmitted in different directions, not one direction.

Figure 13:
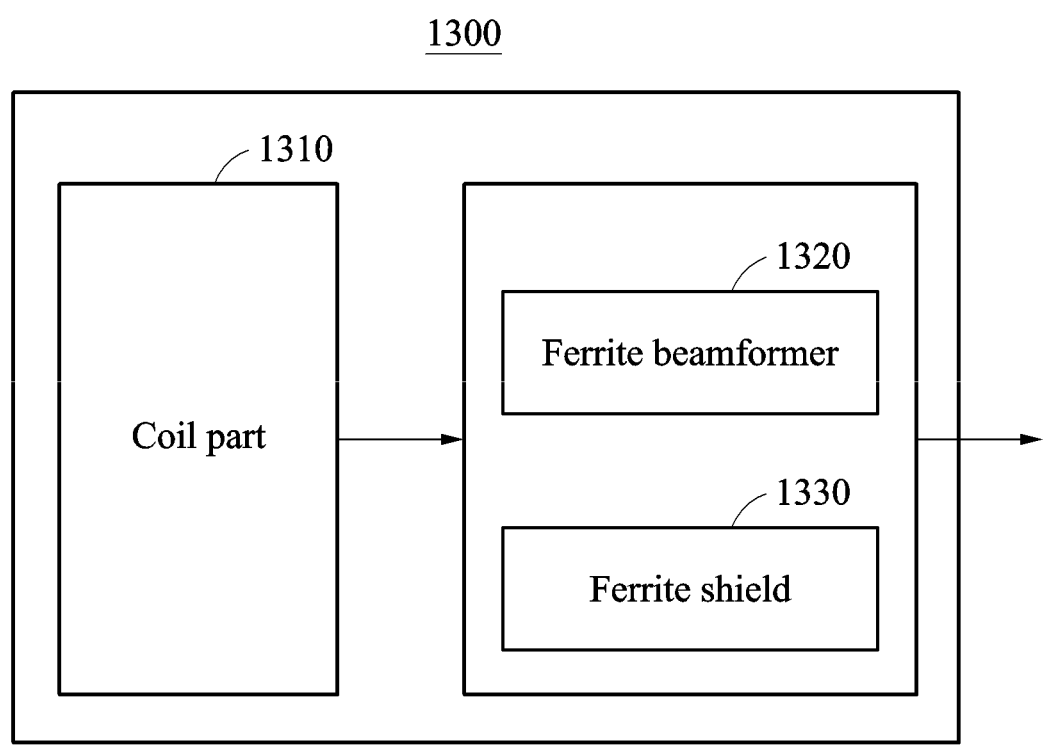
FIG. 13 illustrates a block diagram of a magnetic field generating apparatus according to another embodiment of the present disclosure.

FIG. 13 illustrates a block diagram of a magnetic field generating apparatus according to another embodiment of the present disclosure.

A magnetic field generating apparatus 1300 according to another embodiment of the present disclosure may include a coil part 1310, a ferrite beamformer 1320, and a ferrite shield 1330.

The coil part 1310 may generate a magnetic field that is transmitted to a target to which wireless power is to be supplied.

The ferrite beamformer 1320 may extend in a bar shape in the vicinity of the coil part 1310.

The ferrite beamformer 1320 may beamform a magnetic field in one direction.

The ferrite shield 1330 may include an opening to allow the ferrite beamformer 1320 to rotate about a first rotation axis, may surround the coil part 1310 in a dome shape, and may be configured to rotate about a second rotation axis that is perpendicular to the first rotation axis.

The ferrite shield 1330 may shield a peripheral magnetic field of the coil part 1310.

The ferrite beamformer 1320 may be connected to the ferrite shield 1330.

The ferrite beamformer 1320 and the ferrite shield 1330 may be formed of a ferromagnetic material.

The ferrite beamformer 1320 and the ferrite shield 1330 may be formed of a material in which a magnetic field is satisfactorily induced.

The ferrite beamformer 1320 and the ferrite shield 1330 may be formed of a ferrite material.

Although the shape of the ferrite beamformer 1320 is different from that of the first ferrite member of the magnetic field generating apparatus shown in FIG. 8, a material, function, and the like thereof may be the same as those of the first ferrite member of FIG. 8.

Although the shape of the ferrite shield 1330 is different from the second ferrite member of the magnetic field generating apparatus shown in FIG. 8, a material, function, and the like thereof may be the same as those of the second ferrite member of FIG. 8.

The magnetic field generating apparatus 1300 according to another embodiment of the present disclosure may further include a target tracker (not shown).

The target tracker may sense a target through a sensor and may rotate the ferrite beamformer 1320 and the ferrite shield 1330 such that a magnetic field is directed toward the target.

The target tracker may include a sensor and a rotation driver.

The sensor may sense a position of the target.

For example, the sensor may be an image sensor.

The sensor may sense a position of the target using an image around the magnetic field generating apparatus 1300.

The rotation driver may rotate the ferrite beamformer 1320 about the first rotation axis and rotate the ferrite shield 1330 about the second rotation axis.

The rotation driver may rotate the ferrite beamformer 1320 and the ferrite shield 1330 by target sensing of the sensor such that a magnetic field is concentrated on the target.

Since other components of the magnetic field generating apparatus 1300 of FIG. 13 are the same as those of the magnetic field generating apparatus 800 shown in FIG. 8, detailed description thereof is omitted.

Figure 14:
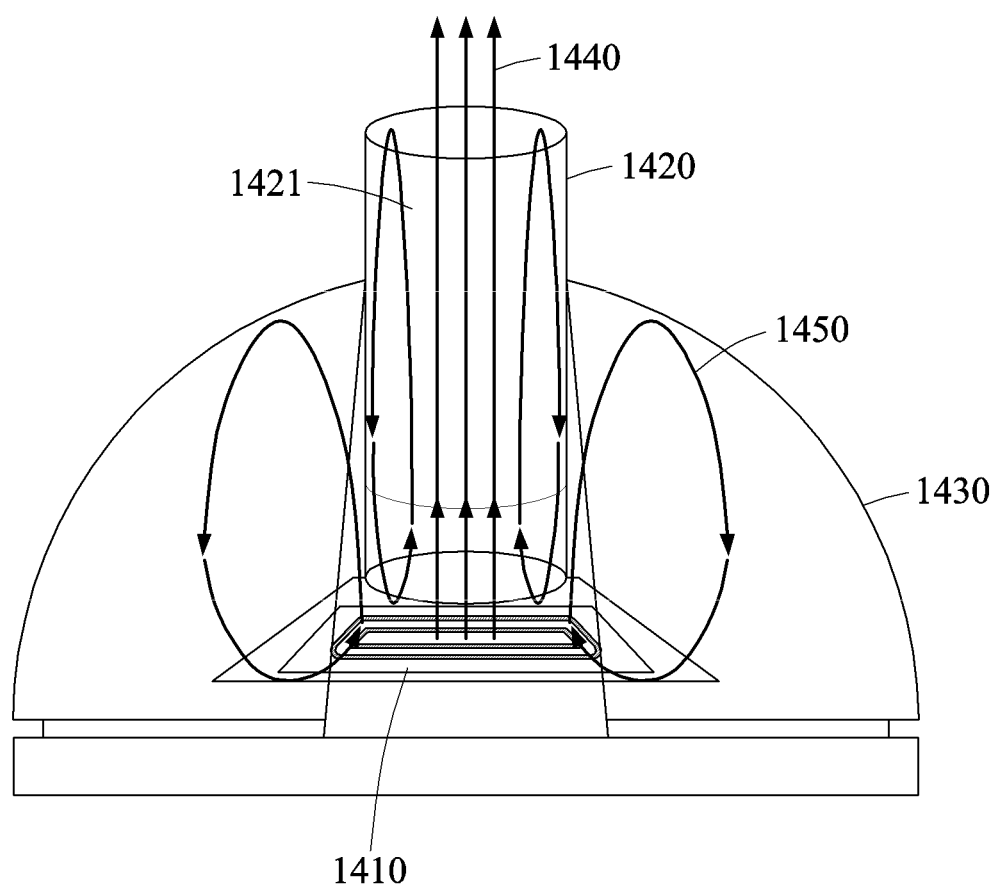
FIG. 14 illustrates the shape and operation principle of the magnetic field generating apparatus illustrated in FIG. 13.

FIG. 14 illustrates the shape and operation principle of the magnetic field generating apparatus illustrated in FIG. 13.

Referring to FIG. 14, the magnetic field generating apparatus may include a coil part 1410, a ferrite beamformer 1420, and a ferrite shield 1430.

The ferrite beamformer 1420 may extend in a bar shape with a predetermined length.

For example, the predetermined length may refer to a minimum length allowing beamforming of a magnetic field 1440 generated from the coil part 1410.

The ferrite beamformer 1420 may be formed in a bar shape and include a through hole 1421 through which a magnetic field passes.

The ferrite beamformer 1420 may be formed perpendicular to the coil part 1410 in the vicinity of the coil part 1410.

The ferrite beamformer 1420 may beamform the magnetic field 1440 in one direction.

One direction in which the magnetic field 1440 is beamformed may be the same as a direction in which the ferrite beamformer 1420 extends in a bar shape.

The ferrite shield 1430 may be formed in a dome shape surrounding the coil part 1410.

Accordingly, the ferrite shield 1430 may shield a peripheral magnetic field 1450 of the coil part 1410.

The peripheral magnetic field 1450 may refer to a magnetic field that is transmitted in different directions, not one direction.

The ferrite shield 1430 may include an opening to allow the ferrite beamformer 1420 to rotate about a first rotation axis.

In the magnetic field generating apparatus shown in FIG. 14, the first rotation axis may be a straight line in a horizontal direction.

The ferrite beamformer 1420 may rotate up and down through the opening.

Here, upon rotation of the ferrite beamformer 1420, the coil part 1410 may also move in the vicinity of an end of the ferrite beamformer 1420 so as to be perpendicular to the ferrite beamformer 1420.

In other words, the coil part 1410 may move in accordance with movement of the ferrite beamformer 1420 such that the magnetic field 1440 is concentrated by the ferrite beamformer 1420.

The ferrite shield 1430 may rotate about a second rotation axis.

The second rotation axis may be perpendicular to the first rotation axis.

In the magnetic field generating apparatus shown in FIG. 14, the second rotation axis may be a straight line in a vertical direction.

Accordingly, the magnetic field 1440 generated from the coil part 1410 may be beamformed along the first rotation axis through the ferrite beamformer 1420 and may be beamformed along the second rotation axis through the ferrite shield 1430.

Figure 15A:
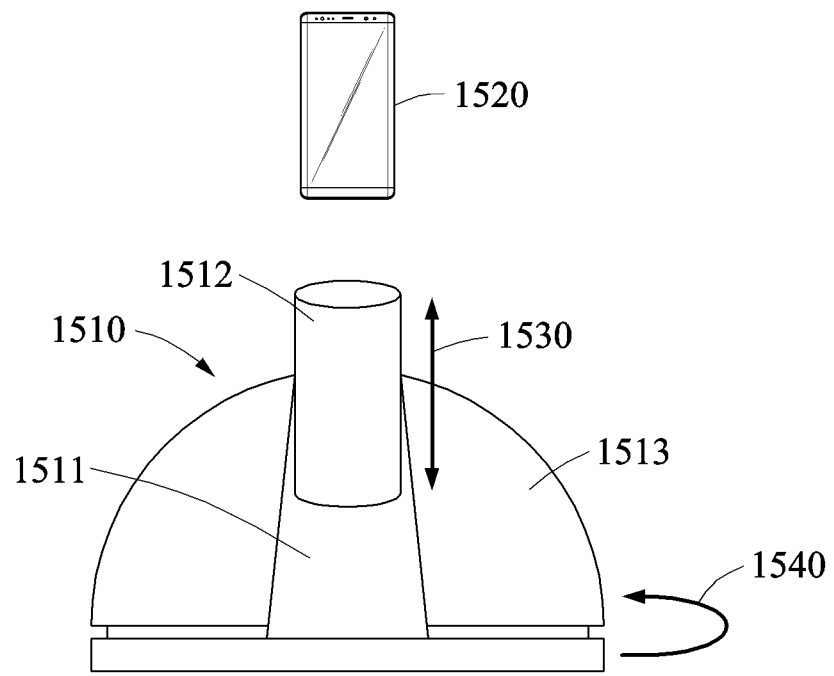
FIGS. 15A and 15B illustrate an operation principle of the magnetic field generating apparatus illustrated in FIG. 13.
Figure 15B:
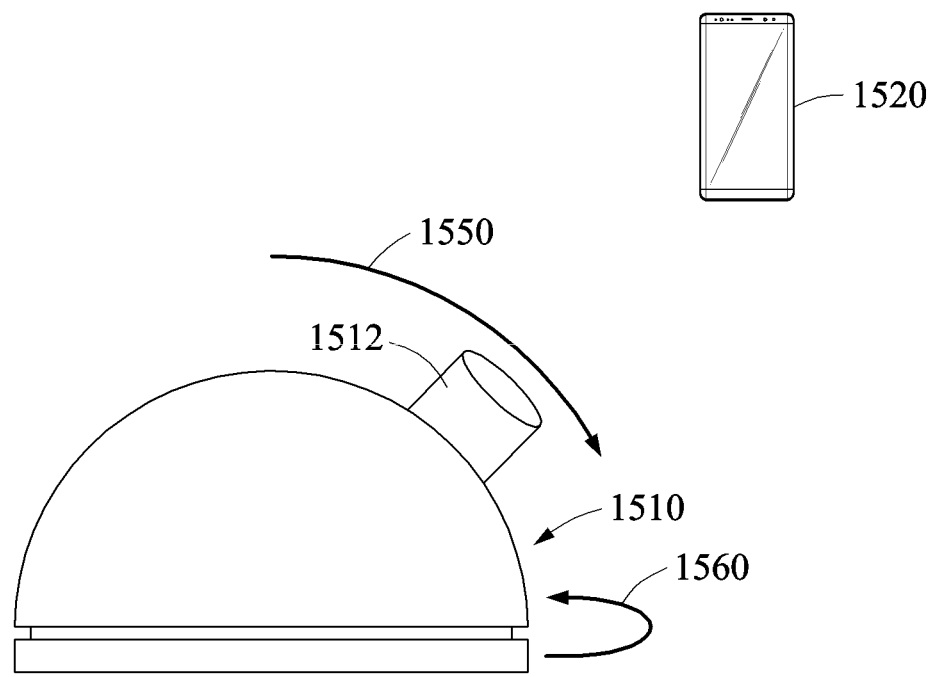

FIGS. 15A and 15B illustrate an operation principle of the magnetic field generating apparatus illustrated in FIG. 13.

Referring to FIG. 15A, a device to be charged 1520 may be placed on a magnetic field generating apparatus 1510.

A ferrite beamformer 1512 may rotate from the front to the back or from the back to the front.

The magnetic field generating apparatus 1510 may sense a position of the device to be charged 1520, rotate (1540) a ferrite shield 1513 about a second rotation axis, and rotate (1530) the ferrite beamformer 1512, using the opening 1511, about a first rotation axis so as to be directed to the target 1520, so that a magnetic field is concentrated on the device to be charged 1520.

Referring to FIG. 15B, the device to be charged 1520 may be located on an upper right side of the magnetic field generating apparatus 1510.

The ferrite beamformer 1512 may be rotated from left to right or right to left by the opening 1511 shown in FIG. 15A.

The magnetic field generating apparatus 1510 may sense a position of the device to be charged 1520, rotate (1560) the ferrite shield 1513 to the right based on the direction shown in FIG. 15A, and rotate (1550) the ferrite beamformer 1512 to the right, so that a magnetic field is concentrated on the device to be charged 1520.

Figure 16:
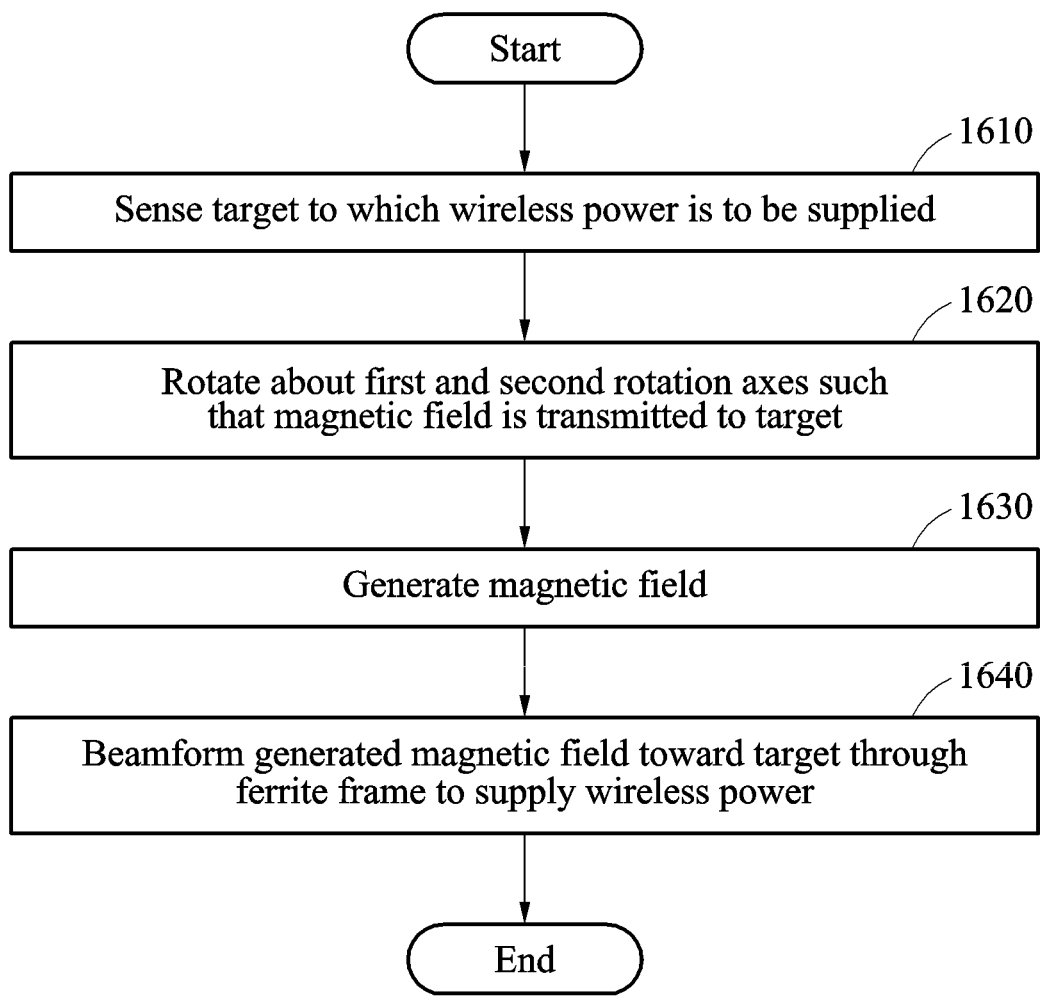
FIG. 16 illustrates a flowchart of a magnetic field generating method according to an embodiment of the present disclosure.

FIG. 16 illustrates a flowchart of a magnetic field generating method according to an embodiment of the present disclosure.

The magnetic field generating method shown in FIG. 16 may be performed by means of the magnetic field generating apparatuses of FIGS. 8 to 15.

Referring to FIG. 16, in S1610, the magnetic field generating apparatus may sense a target to which wireless power is to be supplied.

In S1620, the magnetic field generating apparatus may rotate first and second rotation axes such that a magnetic field is transmitted toward the target.

In S1630, the magnetic field generating apparatus may generate a magnetic field.

In S1640, a generated magnetic field is beamformed toward the target through a ferrite frame, thereby supplying wireless power.

Since the magnetic field generating method described with reference to FIG. 16 is the same as the operation method of the magnetic field generating apparatus described with reference to FIGS. 8 to 15, detailed description thereof is omitted.

Figure 17:
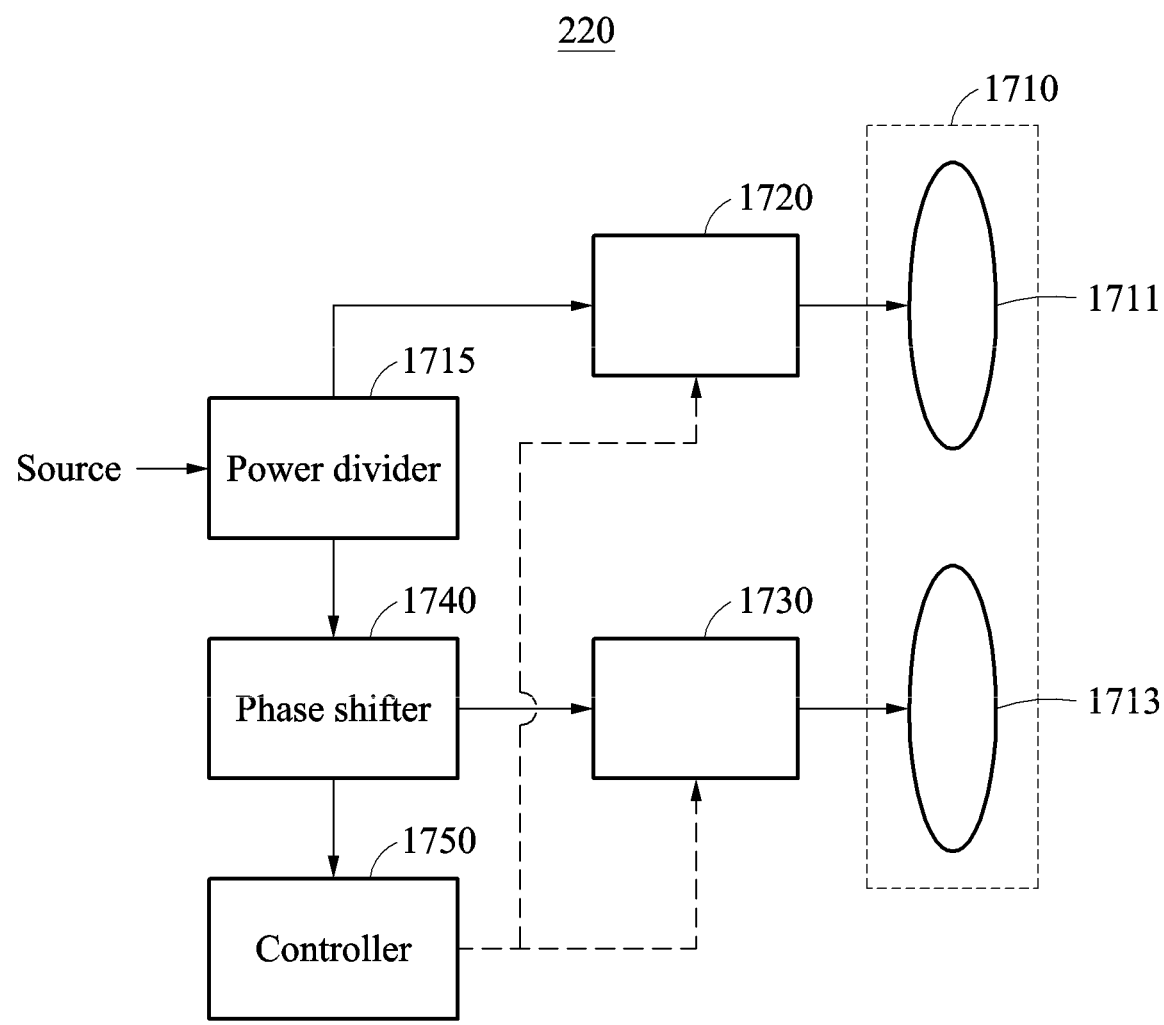
FIG. 17 is a view illustrating another configuration example of the near-field power transmitter of FIG. 2.

FIG. 17 is a view illustrating another configuration example of the near-field power transmitter of FIG. 2.

Referring to FIG. 17, the near-field power transmitter may include a coil part 1710 including a plurality of power transmission coils; a power divider 1715; a first amplifier 1720; a second amplifier 1730; a phase shifter 1740; and a controller 1750.

The coil part 1710 transmits wireless power to a reception coil using a magnetic resonance method.

For example, the coil part 1710 may include two magnetic resonance coils 1711 and 1713.

The first and second magnetic resonance coils 1711 and 1713 may respectively form magnetic coupling with a single reception coil, thereby wirelessly transmitting power.

Such an environment constituted of a plurality of transmission coils and a single reception coil may be referred to as a Multiple Input Single Output (MISO) system.

Meanwhile, an environment constituted of a single transmission coil or a single transmitter and a single reception apparatus may be referred to as a Single Input Single Output (SISO) system.

The MISO system may more efficiently transmit power, and may exhibit superior performance even in an environment in which a power reception apparatus moves, compared to the SISO system.

However, also in the MISO system, magnetic coupling may be greatly affected according to an arranged state of transmission coils and a reception coil.

When phases of currents supplied to the first magnetic resonance coil 1711 and the second magnetic resonance coil 1713 are differently controlled, magnetic coupling may be formed without being greatly affected by an arrangement state of the transmission coils and the reception coil.

The power divider 1715 may divide power from a power source and may output the divided power to the first amplifier 1720 and the phase shifter 1740.

The phase shifter 1740 may change a phase of input power.

The phase shifter 1740 may adjust a phase of a current supplied to the second amplifier 1730 by adjusting a phase of an input current.

Accordingly, phases of currents supplied to the first magnetic resonance coil 1711 and the second magnetic resonance coil 1713 may be differently adjusted.

For example, a difference between phases of currents supplied to the first magnetic resonance coil 1711 and the second magnetic resonance coil 1713 may be set to 0 to 180 degrees.

Through such phase control, an efficiency decrease problem caused by movement of a receiver in the MISO system may be addressed.

Figure 18:
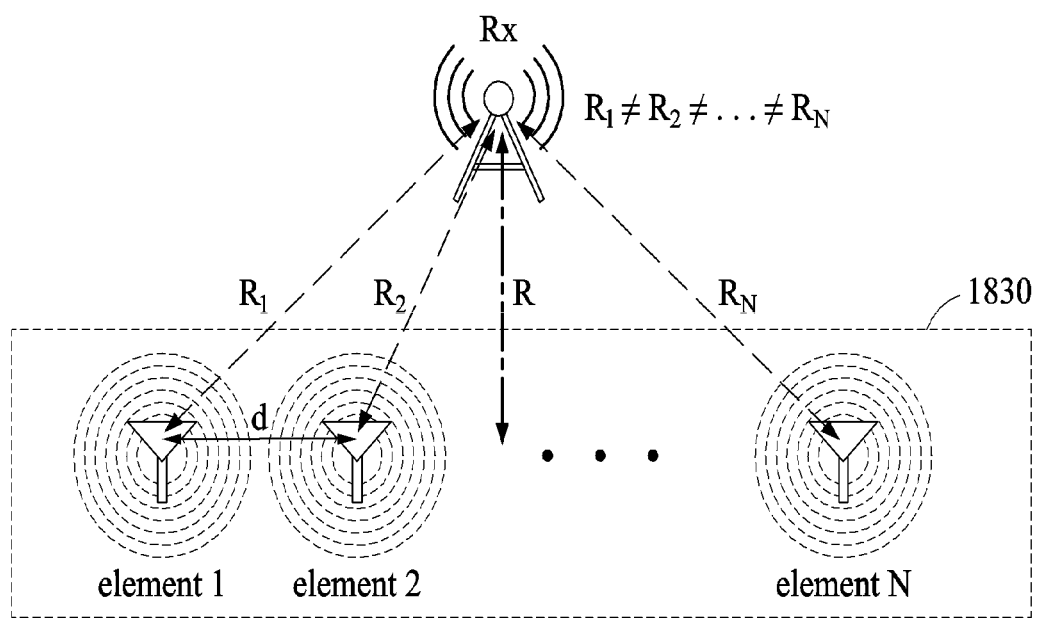
FIG. 18 is a view illustrating another configuration example of the microwave power transmitter of FIG. 2 and an operation environment thereof.

FIG. 18 is a view illustrating another configuration example of the microwave power transmitter of FIG. 2 and an operation environment thereof.

Referring to FIG. 18, the microwave power transmitter may include an array antenna part 1830 including a plurality of antenna elements (element 1 to element N).

The array antenna part 1830 may adjust radiation characteristics by controlling a phase and a magnitude of distribution current of each of the antenna elements.

Here, reception power may be maximized by adjusting a feeding phase of each radiation element so that the electric field is added in the same phase at a position of a reception antenna.

In general, a distance between an array antenna and a reception antenna is assumed to be very far. Accordingly, power transmission efficiency between the antennas may be calculated by applying the Friis formula represented by Equation 1, after assuming that a distance between each of the antenna elements of the array antenna and the reception antenna is equal:

$$\eta = \frac{P_r}{P_t} = \frac{G_t G_r}{\left(\frac{4\pi R}{\lambda}\right)^2} \qquad \text{[Equation 1]}$$

wherein $P_r$ denotes reception power, $P_t$ denotes transmission power, R denotes a distance between the transmission antenna and the reception antenna, $G_t$ denotes a gain of the transmission antenna, and $G_r$ denotes a gain of the reception antenna.

However, the general Friis formula might not be applied to an environment for wireless power transmission because a distance between each of the antenna elements of the array antenna and the reception antenna is different.

Accordingly, a controller 240 or microwave power transmitter 230 of FIG. 2 calculates power transmission efficiency considering an environment for actual wireless power transmission upon calculation of power transmission efficiency.

The controller 240 or microwave power transmitter 230 of FIG. 2 may receive information on reception power through communication with the power reception apparatus, and may calculate power transmission efficiency based on Equation 2 below.

That is, when input power magnitudes of transmission radiation elements are respectively $P_1, P_2, \ldots, P_N$, distances between the reception antenna and the radiation elements are respectively $R_1, R_2, \ldots, R_N$, the radiation elements have the same gain, i.e., $G_{t_0}$, and an antenna gain is $G_r$, power efficiency transmitted to the reception antenna may be represented by Equation 2:

$$\eta = \frac{P_{rec}}{P_{in}} = \frac{G_{t_0} G_r}{\sum_{i=1}^{N} P_i} \left(\frac{\lambda_0}{4\pi}\right)^2 \left(\sum_{i=1}^{N} \frac{\sqrt{P_i}}{R_i}\right)^2 \quad \text{[Equation 2]}$$

wherein an average distance between a radiation element of a transmission end and a reception antenna may be defined by Equation 3. In addition, a power transmission efficiency calculation method according to an embodiment of the present disclosure may be represented by Equation 4:

$$R_{mean} = \frac{N}{\frac{1}{R_1} + \frac{1}{R_2} + \ldots \frac{1}{R_N}}, \left(R_{shortest} < R_{mean} < \frac{\sum_{i=1}^{N} R_i}{N}\right) \quad \text{[Equation 3]}$$

$$\eta = \frac{P_r}{P_t} = \frac{G_t G_r}{\left(\frac{4\pi R_{mean}}{\lambda}\right)^2} \quad \text{[Equation 4]}$$

In accordance with the present disclosure, a wireless power transmission system highly efficient in a three-dimensional selective space in visible and non-visible distance environments can be provided.

In accordance with the present disclosure, a magnetic field generating apparatus capable of concentrating a magnetic field on a desired target due to a cannon shape thereof and a method of generating a magnetic field using the same can be provided.

In accordance with the present disclosure, a magnetic field generating apparatus capable of transmitting wireless power with high efficiency due to a cannon shape thereof and a method of generating a magnetic field using the same can be provided.

In accordance with the present disclosure, a magnetic field generating apparatus capable of beamforming a magnetic field in a desired direction due to a cannon shape thereof and a method of generating a magnetic field using the same can be provided.

In accordance with the present disclosure, a magnetic field generating apparatus capable of preventing a magnetic field from transmitting in different directions, not a desired direction, due to a cannon shape thereof and a method of generating a magnetic field using the same can be provided.

In accordance with the present disclosure, an array constituted of magnetic field generating apparatuses to maximize a beamforming effect and a method of generating a magnetic field using the same can be provided.

The aforementioned device may be realized by hardware component, a software component, and/or a combination of hardware and software components. For example, the device and components described in the embodiments may be realized using one or more general-purpose computers or special-purpose computers such as, for example, a processor, a controller, an arithmetic logic unit (ALU), a digital signal processor, a microcomputer, a field programmable array (FPA), a programmable logic unit (PLU), a microprocessor, or other devices implementing instructions and responding thereto. The processor may execute one or software applications that run on an operating system (OS). In addition, the processor may approach data, store, manipulate, and process the data, and generate new data by responding to running of software. Although one processor has been used to aid in understanding, those skilled in the art can understand that the processor may include a plurality of processing elements and/or a plurality of processing element types. For example, the processor may include a plurality of processors or a combination of one processor and controller. Further, another processing configuration, such as a parallel processor, may be applied.

Software may include a computer program, code, instructions, or a combination of one or more of the foregoing, and may configure a processing device to operate as desired or independently or collectively a command to a processing device. Software and/or data may be permanently or temporarily embodied in the form of any type of machines, components, physical devices, virtual equipment, computer storage media or devices, or a signal wave to be transmitted, so as to be interpreted by a processing device or to provide a command or date to a processing device. Software may be distributed over a networked computer system, and stored or executed in a distributed manner. Software and data may be stored on one or more computer readable media.

Embodiments of the present disclosure can include a computer readable medium including program commands for executing operations implemented through various computers. The computer readable medium can store program commands, data files, data structures or combinations thereof. The program commands recorded in the medium may be specially designed and configured for the present disclosure or be known to those skilled in the field of computer software. Examples of a computer readable recording medium include magnetic media such as hard disks, floppy disks and magnetic tapes, optical media such as CD-ROMs and DVDs, magneto-optical media such as floptical disks, or hardware devices such as ROMs, RAMs and flash memories, which are specially configured to store and execute program commands. Examples of the program commands include a machine language code created by a compiler and a high-level language code executable by a computer using an interpreter and the like. The hardware devices may be configured to operate as one or more software modules to perform operations in the embodiments, and vice versa.

Although exemplary embodiments of the present disclosure have been disclosed for illustrative purposes, those skilled in the art will appreciate that various modifications, additions and substitutions are possible, without departing from the scope and spirit of the disclosure as disclosed in the accompanying claims. For example, proper result may be achieved even if the techniques described above are implemented in an order different from that for the disclosed method, and/or disclosed constituents such as a system, structure, device and circuit are coupled to or combined with each other in a form different from that for the disclosed method or replaced by other constituents or equivalents.

It should be understood, however, that there is no intent to limit the disclosure to the embodiments disclosed, rather, the disclosure is to cover all modifications, equivalents, and alternatives falling within the spirit and scope of the disclosure as defined by the claims.

What is claimed is:

1. A wireless power transmission apparatus for transmitting a power in three-dimensional wireless power transmission environment, comprising:
    a wireless charging pad configured to transmit the power by a magnetic induction method or a magnetic resonance method;
    a near-field power transmitter configured to transmit the power by the magnetic resonance method:
    a microwave power transmitter configured to transmit the power to a three-dimensional space by a microwave power transmission method; and
    a controller configured to control at least one of the wireless charging pad, the near-field power transmitter and the microwave power transmitter by monitoring the three-dimensional wireless power transmission environment,
    wherein the wireless charging pad verifies power transmission coils to be driven and matching a target device to be charged among small power transmission coils, verifies surrounding power transmission coils surrounding the power transmission coils among the small power transmission coils and applies driving voltages with different phases to the power transmission coils and the surrounding power transmission coils,
    wherein the near-field power transmitter or the microwave power transmitter comprises:
    a coil part configured to generate a magnetic field transmitted to the target device to which wireless power is to be supplied;
    a first ferrite member configured to extend in a bar shape in the vicinity of the coil part and penetrate an inner peripheral surface of the coil part; and
    a second ferrite member configured to extend in a dome shape in the vicinity of the coil part, surround the coil part, and comprise an opening formed along a magnetic field transmission path.

2. The wireless power transmission apparatus according to claim 1, wherein the first ferrite member serves to beamform the magnetic field in one direction.

3. The wireless power transmission apparatus according to claim 1, wherein the second ferrite member serves to shield a peripheral magnetic field of the coil part.

4. The wireless power transmission apparatus according to claim 1, further comprising a target tracker configured to sense the target device and drive the first and second ferrite members such that the magnetic field is directed to the target device.

5. A wireless power transmission apparatus for transmitting a power in three-dimensional wireless power transmission environment, comprising:
    a wireless charging pad configured to transmit the power by a magnetic induction method or a magnetic resonance method;
    a near-field power transmitter configured to transmit the power by the magnetic resonance method;
    a microwave power transmitter configured to transmit the power to a three-dimensional space by a microwave power transmission method; and
    a controller configured to control at least one of the wireless charging pad, the near-field power transmitter and the microwave power transmitter by monitoring the three-dimensional wireless power transmission environment,
    wherein the wireless charging pad verifies power transmission coils to be driven and matching a target device to be charged among small power transmission coils, verifies surrounding power transmission coils surrounding the power transmission coils among the small power transmission coils and applies driving voltages with different phases to the power transmission coils and the surrounding power transmission coils,
    wherein the near-field power transmitter or the microwave power transmitter comprises:
    a coil part configured to generate a magnetic field transmitted to the target device to which wireless power is to be supplied;
    a ferrite beamformer with a bar shape configured to extend in a direction perpendicular to the coil part and pass through the magnetic field inside the bar shape; and
    a ferrite shield configured to extend from a predetermined position of the ferrite beamformer and surround the coil part in a dome shape, serve to shield a peripheral magnetic field spreading to a periphery of the ferrite beamformer and concentrate the magnetic field in the inside of the ferrite beamformer.

6. The wireless power transmission apparatus according to claim 5, wherein the ferrite beamformer serves to beamform the magnetic field in one direction.

7. The wireless power transmission apparatus according to claim 5, further comprising a target tracker configured to sense the target device and drive the ferrite beamformer and the ferrite shield such that the magnetic field is directed to the target device.

8. A wireless power transmission apparatus for transmitting a power in three-dimensional wireless power transmission environment, comprising:
    a wireless charging pad configured to transmit the power by a magnetic induction method or a magnetic resonance method;
    a near-field power transmitter configured to transmit the power by the magnetic resonance method:
    a microwave power transmitter configured to transmit the power to a three-dimensional space by a microwave power transmission method; and
    a controller configured to control at least one of the wireless charging pad, the near-field power transmitter and the microwave power transmitter by monitoring the three-dimensional wireless power transmission environment,
    wherein the wireless charging pad verifies power transmission coils to be driven and matching a target device to be charged among small power transmission coils, verifies surrounding power transmission coils surrounding the power transmission coils among the small power transmission coils and applies driving voltages with different phases to the power transmission coils and the surrounding power transmission coils,
    wherein the near-field power transmitter or the microwave power transmitter comprises:
    a coil part configured to generate a magnetic field transmitted to the target device to which wireless power is to be supplied;
    a ferrite beamformer configured to extend in a bar shape in the vicinity of the coil part; and a ferrite shield configured to comprise an opening formed to allow rotation of the ferrite beamformer about a first rotation axis, surround the coil part in a dome shape, and rotate about a second rotation axis perpendicular to the first rotation axis.

9. The wireless power transmission apparatus according to claim 8, wherein the ferrite beamformer serves to beamform the magnetic field in one direction.

10. The wireless power transmission apparatus according to claim 8, wherein the ferrite shield serves to shield a peripheral magnetic field of the coil part.

11. The wireless power transmission apparatus according to claim 8, wherein further comprising a target tracker configured to sense the target device by a sensor, which is comprised in the target tracker, and drive rotation of the ferrite beamformer and the ferrite shield such that the magnetic field is directed to the target device.

* * * * *